United States Patent [19]
Mallinckrodt

[11] Patent Number: 5,612,703
[45] Date of Patent: Mar. 18, 1997

[54] POSITION DETERMINATION IN AN INTEGRATED CELLULAR COMMUNICATIONS SYSTEM

[75] Inventor: Albert J. Mallinckrodt, Santa Ana, Calif.

[73] Assignee: Celsat America, Inc., Torrance, Calif.

[21] Appl. No.: 444,574

[22] Filed: May 19, 1995

Related U.S. Application Data

[60] Division of Ser. No. 145,246, Oct. 28, 1993, Pat. No. 5,446,756, which is a continuation-in-part of Ser. No. 781,972, Oct. 24, 1991, Pat. No. 5,339,330, which is a continuation-in-part of Ser. No. 495,497, Mar. 19, 1990, Pat. No. 5,073,900.

[51] Int. Cl.$^6$ .............................. G01S 3/02; H04M 11/00; H04B 1/00
[52] U.S. Cl. .................. 342/457; 379/59; 455/54.1; 370/335
[58] Field of Search ..................... 342/387, 457, 342/458; 379/59; 455/54.1, 54.2; 375/205

[56] References Cited

U.S. PATENT DOCUMENTS

| | | | |
|---|---|---|---|
| 4,728,959 | 3/1988 | Maloney et al. | 342/457 |
| 4,742,357 | 5/1988 | Rackley | 342/457 |
| 5,023,900 | 6/1991 | Tayloe et al. | 379/32 |
| 5,293,645 | 3/1994 | Sood | 455/54.1 |
| 5,506,864 | 4/1996 | Schilling | 375/205 |

*Primary Examiner*—Gregory C. Issing
*Attorney, Agent, or Firm*—Drummond & Duckworth

[57] ABSTRACT

A cellular communications system is provided having both surface and satellite nodes which are fully integrated for providing service over large areas. Position means are included for determining the position of a selected user unit within the cells by providing a timing signal to the selected user unit from at least one node, providing a timing response signal from the selected user unit in response to each timing signal, receiving the timing response signal by at least one node, measuring the response time of the user unit to the timing signal based on receipt of the timing response signal, and determining the position of the user unit based on the round trip time of transmission of the timing signal and receipt of the timing response signal. Preferably, the invention provides position determination in a cellular communications system using code division multiple access (CDMA) employing forward error correction coding (FECC) and spread spectrum waveforms.

2 Claims, 6 Drawing Sheets

POSITION DETERMINATION IN AN INTEGRATED CELLULAR COMMUNICATIONS SYSTEM

RELATED APPLICATIONS

This application is a divisional application of U.S. application Ser. No. 08/145,246, now U.S. Pat. No. 5,446,756, filed Oct. 28, 1993, which is in-turn, a continuation-in-part of U.S. application Ser. No. 07/781,972, filed Oct. 24, 1991, now U.S. Pat. No. 5,339,330, which was, in-turn, the National Stage Application of PCT Application S/N PCT/US91/01852 filed Mar. 19, 1991, which was, in-turn, a continuation-in-part of U.S. application Ser. No. 07/495,497, filed Mar. 19, 1990, now U.S. Pat. No. 5,073,900.

BACKGROUND

The invention relates to communication systems and in particular, to a cellular mobile communications system having integrated satellite and ground nodes.

In further detail, the invention relates to position determination of individual users of the cellular mobile communications system.

The cellular communications industry has grown at a fast pace in the United States and even faster in some other countries. It has become an important service of substantial utility and because of the growth rate, saturation of the existing service is of concern. High density regions having high use rates, such as Los Angeles, New York and Chicago are of most immediate concern. Contributing to this concern is the congestion of the electromagnetic frequency spectrum which is becoming increasingly severe as the communication needs of society expand. This congestion is caused not only by cellular communications systems but also by other communications systems. However, in the cellular communications industry alone, it is estimated that the number of mobile subscribers will increase on a world-wide level by an order of magnitude within the next ten years. The radio frequency spectrum is limited and in view of this increasing demand for its use, means to more efficiently use it are continually being explored.

Existing cellular radio is primarily aimed at providing mobile telephone service to automotive users in developed metropolitan areas. For remote area users, airborne users, and marine users, AIRFONE and INMARSAT services exist but coverage is incomplete and service is relatively expensive. Mobile radio satellite systems in an advanced planning stage will probably provide improved direct-broadcast voice channels to mobile subscribers in remote areas but still at significantly higher cost in comparison to existing ground cellular service. The ground cellular and planned satellite technologies complement one another in geographical coverage in that the ground cellular communications service provides voice telephone service in relatively developed urban and suburban areas but not in sparsely populated areas, while the planned earth orbiting satellites will serve the sparsely populated areas. Although the two technologies use the same general area of the RF spectrum, they are basically separate and incompatible by design as they presently exist. At present, if a user needs both forms of mobile communications coverage, he must invest in two relatively expensive subscriber units, one for each system.

The demand for mobile telephone service is steadily expanding and with the expansion of the service, the problem of serving an increased number of subscribers who are travelling from one region to another has become of primary importance. Cellular communications systems divide the service areas into geographical cells, each served by a base station or node typically located at its center. The central node transmits sufficient power to cover its cell area with adequate field strength. If a mobile user moves to a new cell, the radio link is switched to the new node provided there is an available channel. However, if the mobile user travels into a region where all channels are busy, or that is not served by any cellular service, or, in some cases, into an area served by a different licensee/provider, then his call may be abruptly terminated.

Present land mobile communication systems typically use a frequency modulation (FM) approach and because of the limited interference rejection capabilities of FM modulation, each radio channel may be used only once over a wide geographical area encompassing many cells. This means that each cell can use only a small fraction of the total allocated radio frequency band, resulting in an inefficient use of the available spectrum. In some cases, the quality of speech is poor because of the phenomena affecting FM transmission known as fading and "dead spots." The subjective effect of fading is repeated submersion of the voice signal in background noise frequently many times per second if the mobile unit is in motion. The problem is exacerbated by interference from co-channel users in distant cells and resultant crosstalk due to the limited interference rejection capability of FM. Additionally, communications privacy is relatively poor; the FM signal may be heard by others who are receiving that frequency.

In the case where one band of frequencies is preferable over others and that one band alone is to be used for mobile communications, efficient communications systems are necessary to assure that the number of users desiring to use the band can be accommodated. For example, there is presently widespread agreement on the choice of L-band as the technically preferred frequency band for the satellite-to-mobile link in mobile communications systems. In the case where this single band is chosen to contain all mobile communications users, improvements in spectral utilization in the area of interference protection and in the ability to function without imposing intolerable interference on other services will be of paramount importance in the considerations of optimal use of the scarce spectrum.

The spread spectrum communications technique is a technology that has found widespread use in military applications which must meet requirements for security, minimized likelihood of signal detection, and minimum susceptibility to external interference or jamming. In a spread spectrum system, the data modulated carrier signal is further modulated by a relatively wide-band, pseudo-random "spreading" signal so that the transmitted bandwidth is much greater than the bandwidth or rate of the information to be transmitted. Commonly the "spreading" signal is generated by a pseudo-random deterministic digital logic algorithm which is duplicated at the receiver.

By further modulating the received signal by the same spreading waveform, the received signal is remapped into the original information bandwidth to reproduce the desired signal. Because a receiver is responsive only to a signal that was spread using the same unique spreading code, a uniquely addressable channel is possible. Also, the power spectral density is low and without the unique spreading code the signal is very difficult to detect, much less decode, so privacy is enhanced and interference with the signals of other services is reduced. The spread spectrum signal has strong immunity to multipath fading, interference from other users of the same system, and interference from other systems.

In a satellite communications system, downlink power is an important consideration. Satellite power is severely limited; therefore, the number of users of the satellite that can be accommodated, and consequently the economic viability of such a system, is in inverse proportion to how much satellite transmitter power must be allocated to each user. Many of the proposed mobile communications satellite systems have relied upon user antenna directivity to provide additional effective power gain. This has resulted in significant user equipment expense and the operational inconvenience of having to perform some steering or selection of the antenna to point at the satellite. Additionally, hand-held transceivers are impractical because of the relatively large directive antennas required.

In some ground cellular service, the user transceiver commonly radiates at a power level which is 30 to 40 dB greater than is required on the average in order to overcome fading nulls. This results in greatly increased intersystem interference and reduced battery life. It would also be desirable to provide a power control system to compensate for fading and interference without exceeding the minimum amount of power necessary to overcome such interference.

A user position determination capability would be useful for certain applications of a cellular communications system. An example includes the tracking of the progress of commercial vehicles en route. A further use of position determination in a cellular communication system would be to provide users with an indication of their own position. Such a capability would be more useful with increased accuracy. Furthermore, a position means would also be useful for determining in which cell a selected user unit is in and for indicating the location of the cell. This information could then be used by the integrated cellular communication system to determine transmit power levels of the user and nodal transmitters.

A position determination would also be useful in determining from which node to transmit a signal. Instead of transmitting a nodal signal throughout a cellular communication system, position determination could be employed to determine from which one node to transmit. Further, if mobile user moves to a new cell, the radio link may be switched based upon the cellular communication system's knowledge of the user's position. This would provide for optimal power utilization and reduce fading and interference throughout the system.

Thus, it would be desirable to provide a position determination means in a cellular communications system which integrates satellite nodes, surface nodes and mobile units.

SUMMARY OF THE INVENTION

Briefly and in general terms, the invention, in one aspect, is directed to a cellular communications system having at least one node positioned so as to establish a set of cells with each node including means for transmitting and receiving spread spectrum waveforms in a common frequency band. Each user unit within the set of cells includes means for communicating with each node and being operatively responsive to a predetermined one of the spread spectrum waveforms to thereby establish selective communication with at least one of the nodes. Position means are included for determining the position of a selected user unit by providing a timing signal to the selected user unit from at least one node, providing a timing response signal from the selected user unit in response to each timing signal, receiving the timing response signal by at least one node, measuring the response time of the user unit to the timing signal based on receipt of the timing response signal, and determining the position of the user unit based on the round trip time of transmission of the timing signal and receipt of the timing response signal.

In a more detailed aspect of the invention, the position means comprises means for measuring the response times of the user unit to respective timing signals transmitted by at least two nodes and for determining the position of the selected user unit based on the round trip times from each timing signal transmitting surface node.

In yet a further aspect, the position means comprises means for determining the position of the selected user unit by measuring at a plurality of nodes the response time of the user unit to a timing signal transmitted by at least one of the nodes and determining the position of the selected user unit based on the times of receipt by the nodes of the timing response signal from the user unit.

In another aspect, the position means may store a priori information about the selected user unit and may determine the position of the selected user unit by providing a timing signal to the user unit from a node, measuring the response time of the user unit to the timing signal at the node, and determining the position of the user unit based on such measurement and on the a priori information. Additionally, the position means is also for determining in which cell a selected user unit is in and for indicating the location of the cell.

Preferably, the invention provides position determination in a cellular communications system using code division multiple access (CDMA) and spread spectrum waveforms. The CDMA and spread spectrum system makes possible the use of very low rate, highly redundant coding without loss of capability to accommodate a large number of users within the allocated bandwidth.

Other aspects and advantages of the invention will become apparent from the following detailed description and the accompanying drawings, illustrating by way of example the features of the invention.

DETAILED DESCRIPTION OF THE PREFERRED EMBODIMENTS

As is shown in the exemplary drawings, the invention is embodied in a cellular communications system utilizing integrated satellite and ground nodes both of which use the same modulation, coding, and spreading structure and both responding to an identical user unit.

Figure 1:
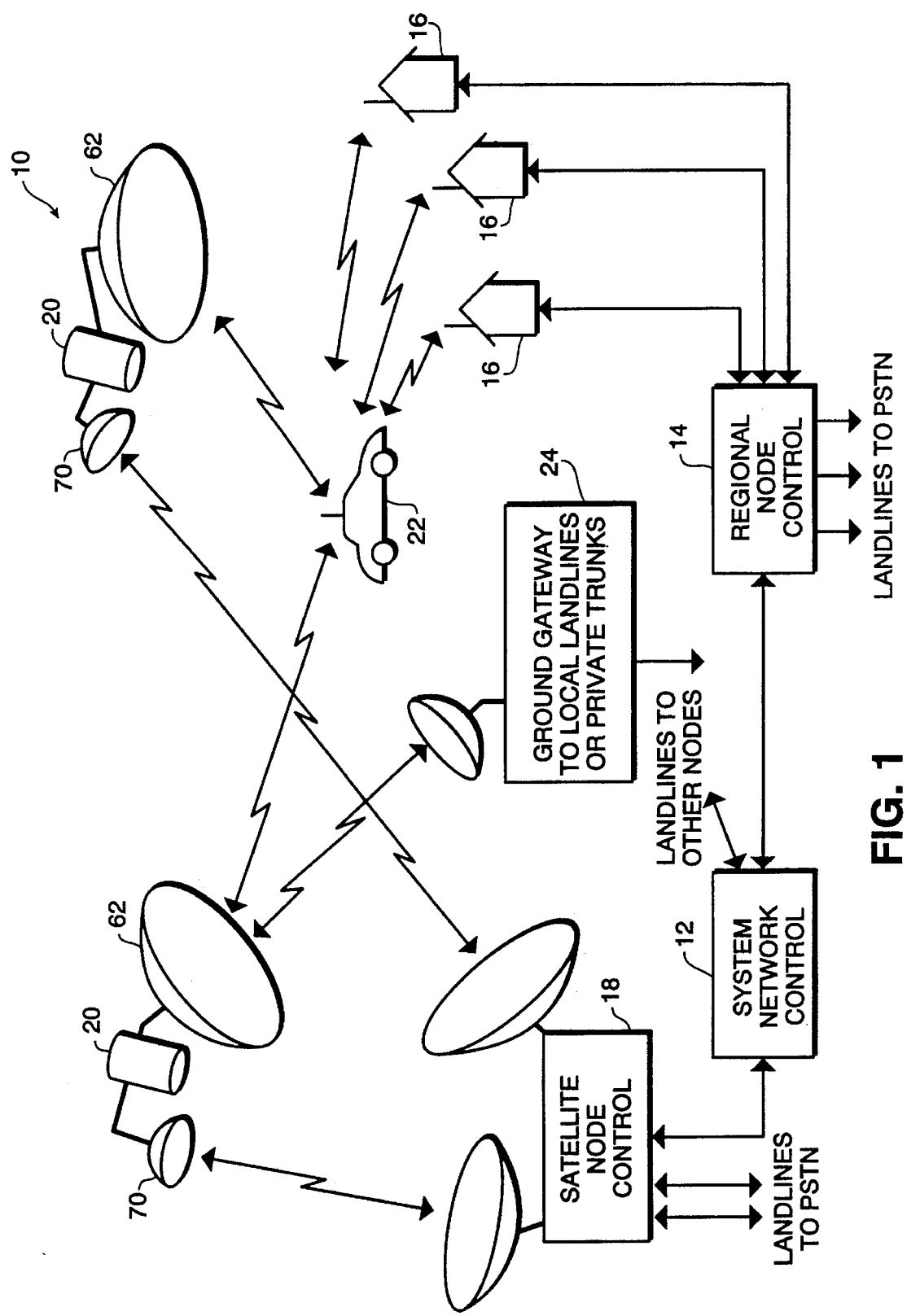
FIG. 1 is a block diagram showing an overview of the principal elements of a communications system in accordance with the principles of the invention.

Referring now to FIG. 1, an overview of a communications system 10 is presented showing the functional interrelationships of the major elements. The system network control center 12 directs the top level allocation of calls to satellite and ground regional resources throughout the system. It also is used to coordinate system-wide operations, to keep track of user locations, to perform optimum allocation of system resources to each call, dispatch facility command codes, and monitor and supervise overall system health. The regional node control centers 14, one of which is shown, are connected to the system network control center 12 and direct the allocation of calls to ground nodes within a major metropolitan region. The regional node control center 14 provides access to and from fixed land communication lines, such as commercial telephone systems known as the public switched telephone network (PSTN). The ground nodes 16 under direction of the respective regional node control center 14 receive calls over the fixed land line network, encode them, spread them according to the unique spreading code assigned to each designated user, combine them into a composite signal, modulate that composite signal onto the transmission carrier, and broadcast them over the cellular region covered.

Satellite node control centers 18 are also connected to the system network control center 12 via status and control land lines and similarly handle calls designated for satellite links such as from PSTN, encode them, spread them according to the unique spreading codes assigned to the designated users, and multiplex them with other similarly directed calls into an uplink trunk, which is beamed up to the designated satellite 20. Satellite nodes 20 receive the uplink trunks, frequency demultiplex the calls intended for different satellite cells, frequency translate and direct each to its appropriate cell transmitter and cell beam, and broadcast the composite of all such similarly directed calls down to the intended satellite cellular area. As used herein, "backhaul" means the link between a satellite 20 and a satellite node control center 18. In one embodiment, it is a K-band frequency while the link between the satellite 20 and the user unit 22 uses an L-band or an S-band frequency.

As used herein, a "node" is a communication site or a communication relay site capable of direct one- or two-way radio communication with users. Nodes may include moving or stationary surface sites or airborne or satellite sites.

User units 22 respond to signals of either satellite or ground node origin, receive the outbound composite signal, separate out the signal intended for that user by despreading using the user's assigned unique spreading code, demodulate, and decode the information and deliver the call to the user. Such user units 22 may be mobile or may be fixed in position. Gateways 24 provide direct trunks, that is, groups of channels, between satellite and the ground public switched telephone system or private trunk users. For example, a gateway may comprise a dedicated satellite terminal for use by a large company or other entity. In the embodiment of FIG. 1, the gateway 24 is also connected to that system network controller 12.

All of the above-discussed centers, nodes, units and gateways are full duplex transmit/receive performing the corresponding inbound (user to system) link functions as well in the inverse manner to the outbound (system to user) link functions just described.

Figure 2:
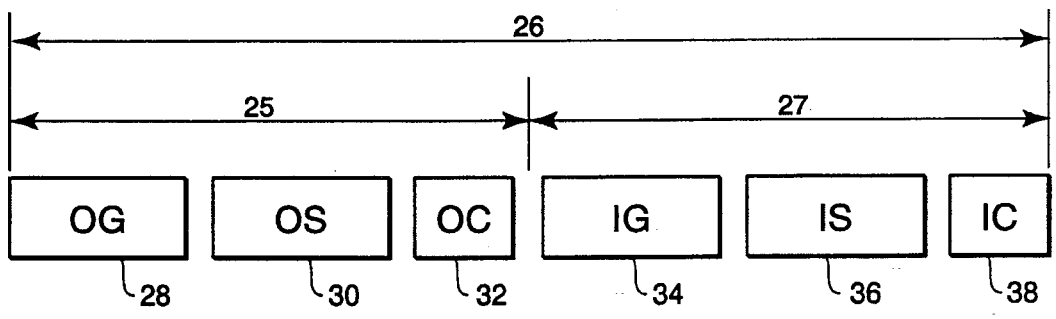
FIG. 2 is a diagram of the frequency sub-bands of the frequency band allocation for a cellular system.

Referring now to FIG. 2, the allocated frequency band 26 of a communications system is shown. The allocated frequency band 26 is divided into 2 main sub-bands, an outgoing sub-band 25 and an incoming sub-band 27. Additionally the main sub-bands are themselves divided into further sub-bands which are designated as follows:

OG: Outbound Ground 28 (ground node to user)

OS: Outbound Satellite 30 (satellite node to user)

OC: Outbound Calling and Command 32 (node to user)

IG: Inbound Ground 34 (user to ground node)

IS: Inbound Satellite 36 (user to satellite node)

IC: Inbound Calling and Tracking 38 (user to node)

All users in all cells use the entire designated sub-band for the described function. Unlike existing ground or satellite mobile systems, there is no necessity for frequency division by cells; all cells may use these same basic six sub-bands. This arrangement results in a higher frequency reuse factor as is discussed in more detail below.

In one embodiment, a mobile user's unit 22 will send an occasional burst of an identification signal in the IC sub-band either in response to a poll or autonomously. This may occur when the unit 22 is in standby mode. This identification signal is tracked by the regional node control center 14 as long as the unit is within that respective region, otherwise the signal will be tracked by the satellite node or nodes. In another embodiment, this identification signal is tracked by all ground and satellite nodes capable of receiving it. This information is forwarded to the network control center 12 via status and command lines. By this means, the applicable regional node control center 14 and the system network control center 12 remain constantly aware of the cellular location and link options for each active user 22. An intra-regional call to or from a mobile user 22 will generally be handled solely by the respective regional node control center 14. Inter-regional calls are assigned to satellite or ground regional system resources by the system network control center 12 based on the location of the parties to the call, signal quality on the various link options, resource availability and best utilization of resources.

A user 22 in standby mode constantly monitors the common outbound calling frequency sub-band OC 32 for calling signals addressed to him by means of his unique spreading code. Such calls may be originated from either ground or satellite nodes. Recognition of his unique call code initiates the user unit 22 ring function. When the user goes "off-hook", e.g. by lifting the handset from its cradle, a return signal is broadcast from the user unit 22 to any receiving node in the user calling frequency sub-band IC 38. This initiates a handshaking sequence between the calling node and the user unit which instructs the user unit whether to transition to either satellite, or ground frequency sub-bands, OS 30 and IS 36 or OG 28 and IG 34.

A mobile user wishing to place a call simply takes his unit 22 off hook and dials the number of the desired party, confirms the number and "sends" the call. Thereby an incoming call sequence is initiated in the IC sub-band 38. This call is generally heard by several ground and satellite nodes which forward call and signal quality reports to the appropriate system network control center 12 which in turn designates the call handling to a particular satellite node 20 or regional node control center 14. The call handling element then initiates a handshaking function with the calling unit over the OC 32 and IC 38 sub-bands, leading finally to transition to the appropriate satellite or ground sub-bands for communication.

Figure 3:
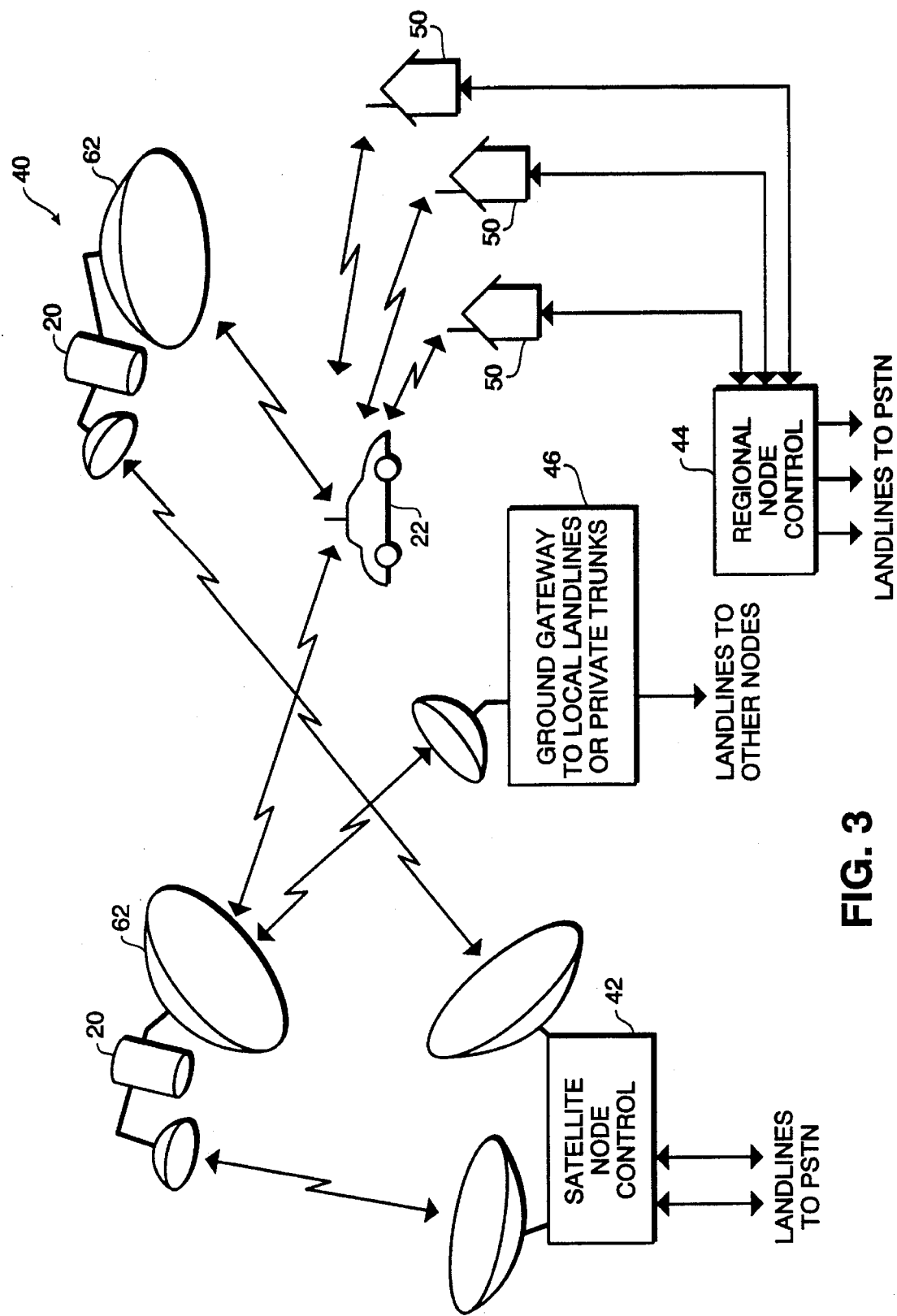
FIG. 3 is an overview block diagram of a communications system in accordance with the principles of the invention without a network control center.

Referring now to FIG. 3, a block diagram of a communications system 40 which does not include a system network control center is presented. In this system, the satellite node control centers 42 are connected directly into the land line network as are also the regional node control centers 44. Gateway systems 46 are also available as in the system of FIG. 1 and connect the satellite communications to the appropriate land line or other communications systems. The user unit 22 designates satellite node 48 communication or ground node 50 communication by sending a predetermined code.

Figure 4:
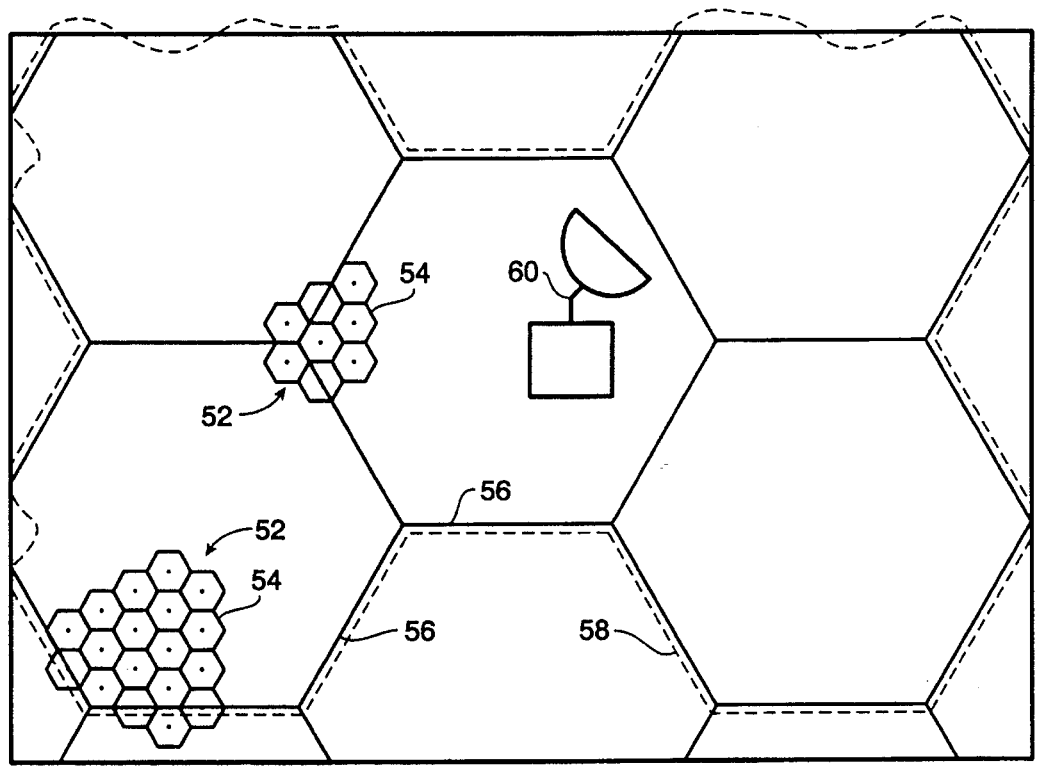
FIG. 4 is a diagram showing the interrelationship of the cellular hierarchical structure of the ground and satellite nodes in a typical section and presents a cluster comprising more than one satellite cell.

Referring now to FIG. 4, a hierarchical cellular structure is shown. A pair of clusters 52 of ground cells 54 are shown. Additionally, a plurality of satellite cells 56 are shown. Although numerals 54 and 56 point only to two cells each, this has been done to retain clarity in the drawing. Numeral 54 is meant to indicate all ground cells in the figure and similarly numeral 56 is meant to indicate all satellite cells. The cells are shown as hexagonal in shape, however, this is exemplary only. The ground cells may be from 3 to 15 km across although other sizes are possible depending on user density in the cell. The satellite cells may be approximately 200–500 km across as an example depending on the number of beams used to cover a given area. As shown, some satellite cells may include no ground cells. Such cells may cover undeveloped areas for which ground nodes are not practical. Part of a satellite cluster 58 is also shown. The cell members of such a cluster share a common satellite node control center 60.

A significant advantage of the communication system is that by the use of spread spectrum multiple access, adjacent cells are not required to use different frequency bands. All ground-user links utilize the same two frequency sub-bands (OG 28, IG 34) and all satellite-user links use the same two frequency sub-bands (OS 30, IS 36). This obviates an otherwise complex and restrictive frequency coordination problem of ensuring that frequencies are not reused within cells closer than some minimum distance to one another (as in the FM approach), and yet provides for a hierarchical set of cell sizes to accommodate areas of significantly different subscriber densities.

Referring again to FIG. 1 as well as to FIG. 4, the satellite nodes 20 make use of large, multiple-feed antennas 62 which in one embodiment provide separate, relatively narrow beamwidth beams and associated separate transmitters for each satellite cell 56. For example, the multiple feed antenna 62 may cover an area such as the United States with, typically, about 100 satellite beams/cells and in one embodiment, with about 200 beams/cells. As used herein, "relatively narrow beamwidth" refers to a beamwidth that results in a cell of 500 km or less across. The combined satellite/ground nodes system provides a hierarchical geographical cellular structure. Thus within a dense metropolitan area, each satellite cell 56 may further contain as many as 100 or more ground cells 54, which ground cells would normally carry the bulk of the traffic originated therein. The number of users of the ground nodes 16 is anticipated to exceed the number of users of the satellite nodes 20 where ground cells exist within satellite cells. Because all of these ground node users would otherwise interfere as background noise with the intended user-satellite links, in one embodiment the frequency band allocation may be separated into separate segments for the ground element and the space element as has been discussed in connection with FIG. 2. This combined, hybrid service can be provided in a manner that is smoothly transparent to the user. Calls will be allocated among all available ground and satellite resources in the most efficient manner by the system network control center 12.

An important parameter in most considerations of cellular radio communications systems is the "cluster", defined as the minimal set of cells such that mutual interference between cells reusing a given frequency sub-band is tolerable provided that such "co-channel cells" are in different clusters. Conversely all cells within a cluster must use different frequency sub-bands. The number of cells in such a cluster is called the "cluster size". It will be seen that the "frequency reuse factor", i.e. the number of possible reuses of a frequency sub-band within the system is thus equal to the number of cells in the system divided by the cluster size. The total number of channels that can be supported per cell, and therefore overall bandwidth efficiency of the system is thus inversely proportional to the cluster size.

Figure 5:
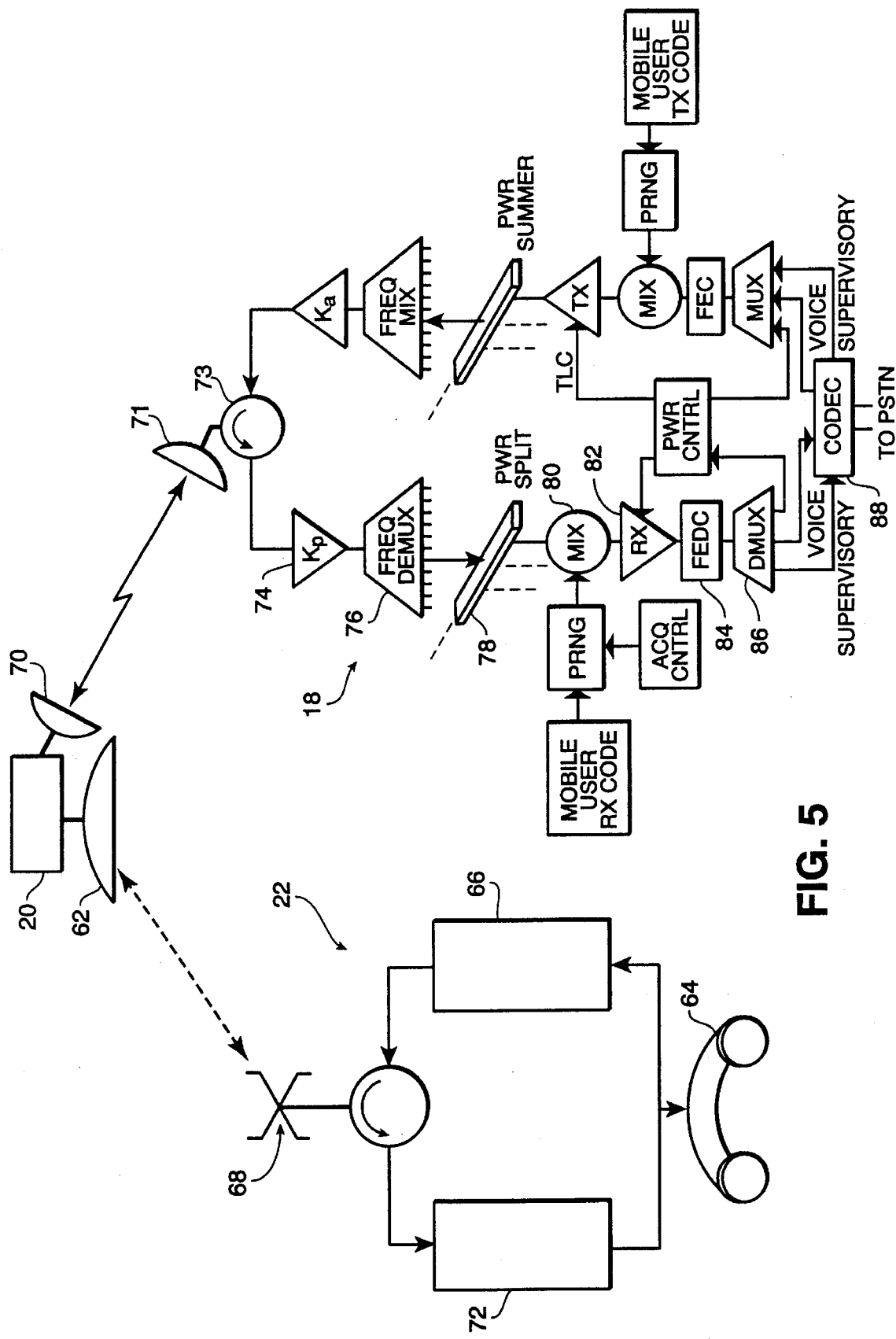
FIG. 5 is a block diagram of a satellite link system showing the user unit and satellite node control center.

Referring now to FIG. 5, a block diagram is shown of a typical user unit 22 to satellite 20 to satellite node control 18 communication and the processing involved in the user unit 22 and the satellite node control 18. In placing a call for example, the handset 64 is lifted and the telephone number entered by the user. After confirming a display of the number dialed, the user pushes a "send" button, thus initiating a call request signal. This signal is processed through the transmitter processing circuitry 66 which includes spreading the signal using a calling spread code. The signal is radiated by the omnidirectional antenna 68 and received by the satellite 20 through its narrow beamwidth antenna 62. The satellite processes the received signal as will be described below and sends the backhaul to the satellite node control center 18 by way of its backhaul antenna 70. On receive, the antenna 68 of the user unit 22 receives the signal and the receiver processor 72 processes the signal. Processing by the user unit 22 will be described in more detail below in reference to FIG. 7.

The satellite node control center 18 receives the signal at its antenna 71, applies it to a circulator 73, amplifies 74, frequency demultiplexes 76 the signal separating off the composite signal which includes the signal from the user shown in FIG. 5, splits it 78 off to one of a bank of code correlators, each of which comprises a mixer 80 for removing the spreading and identification codes, an AGC amplifier 82, the FECC alemodulator 84, a demultiplexer 86 and finally a voice encoder/decoder (CODEC) 88 for converting digital voice information into an analog voice signal. The voice signal is then routed to the appropriate land line, such as a commercial telephone system. Transmission by the satellite node control center 18 is essentially the reverse of the above described reception operation.

Figure 6:
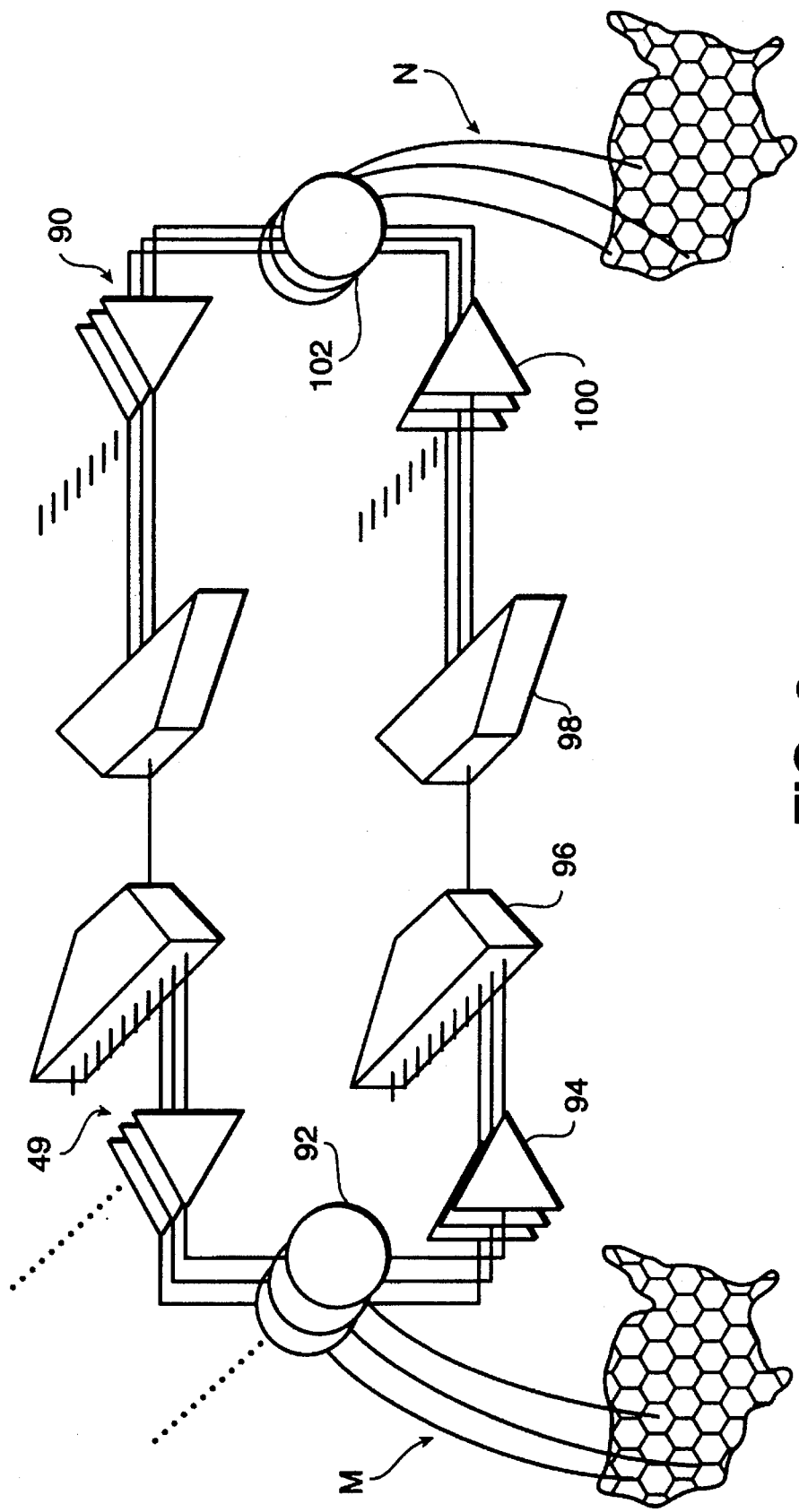
FIG. 6 is a block diagram of one embodiment of satellite signal processing in the system of FIG. 5.

Referring now to FIG. 6, the satellite transponder 90 of FIG. 5 is shown in block diagram form. A circulator/diplexer 92 receives the uplink signal and applies it to an L-band or S-band amplifier 94 as appropriate. The signals from all the M satellite cells within a "cluster" are frequency multiplexed 96 into a single composite K-band backhaul signal occupying M times the bandwidth of an individual L-/S-band mobile link channel. The composite signal is then split 98 into N parts, separately amplified 100, and beamed through a second circulator 102 to N separate satellite ground cells. This general configuration supports a number of particular configurations various of which may be best adapted to one or another situation depending on system optimization which for example may include considerations related to regional landline long distance rate structure, frequency allocation and subscriber population. Thus, for a low density rural area, one may utilize an M-to-1 (M>1, N=1) cluster configuration of M contiguous cells served by a single common satellite ground node with M limited by available bandwidth. In order to provide high-value, long distance service between metropolitan areas, already or best covered for local calling by ground cellular technology, an M-to-M configuration would provide an "intermetropolitan bus" which would tie together all occupants of such M satellite cells as if in a single local calling region. To illustrate, the same cells (for example, Seattle, Los Angeles, Omaha and others) comprising the cluster of M user cells on the left side of FIG. 6, are each served by corresponding backhaul beams on the right side of FIG. 6.

Figure 7:
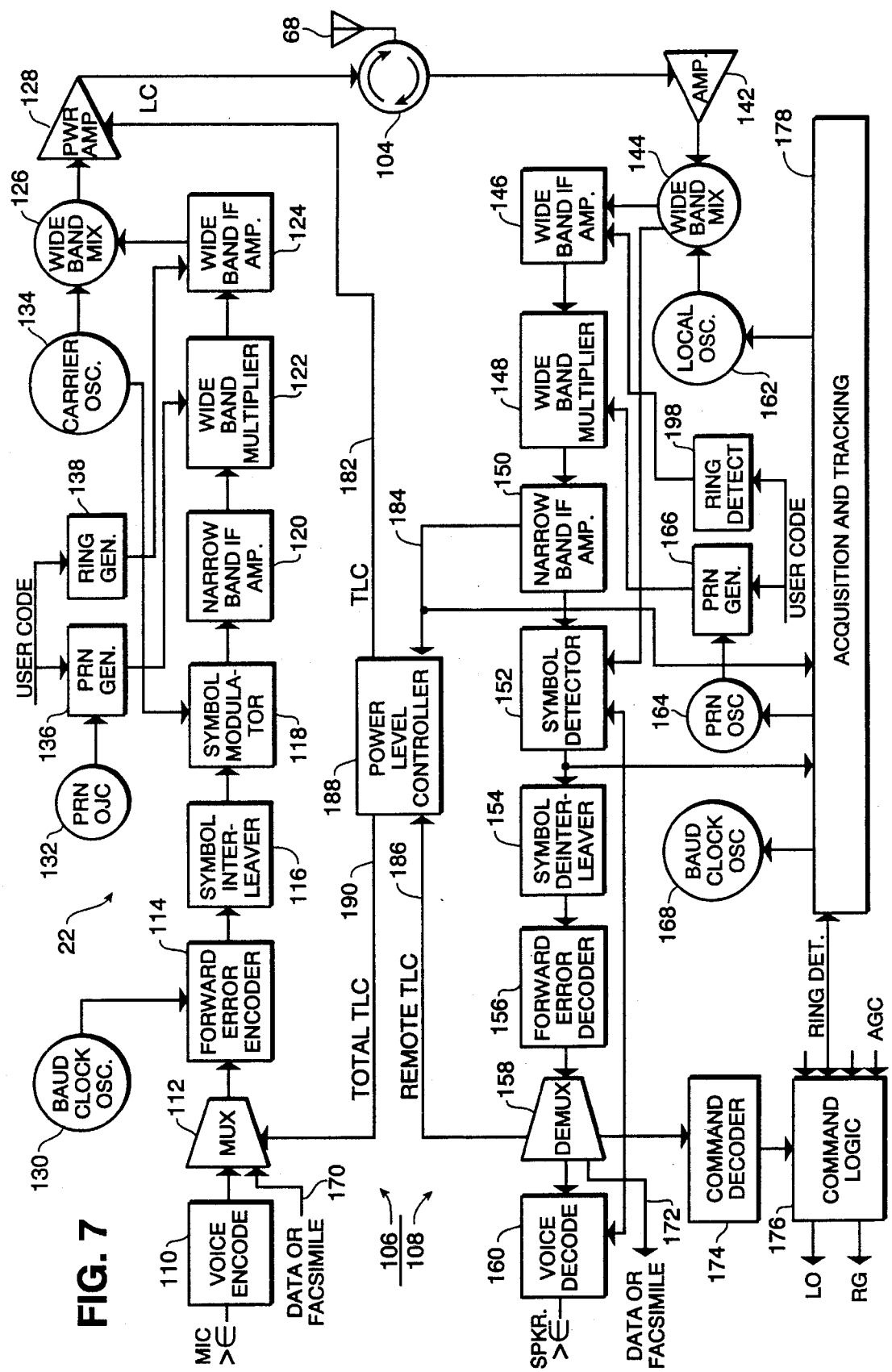
FIG. 7 is a functional block diagram of a user transceiver showing an adaptive power control system.

Referring now to FIG. 7, a functional block diagram of a typical user unit 22 is shown. The user unit 22 comprises a small, light-weight, low-cost, mobile transceiver handset with a small, non-directional antenna 68. The single antenna 68 provides both transmit and receive functions by the use of a circulator/diplexer 104 or other means. It is fully portable and whether stationary or in motion, permits access to a wide range of communication services from one telephone with one call number. It is anticipated that user units will transmit and receive on frequencies in the 1–3 GHz band but can operate in other bands as well.

The user unit 22 shown in FIG. 7 comprises a transmitter section 106 and a receiver section 108. For the transmission of voice communication, a microphone couples the voice signal to a voice encoder 110 which performs analog to digital encoding using one of the various modem speech coding technologies well known to those skilled in the art. The digital voice signal is combined with local status data, and/or other data, facsimile, or video data forming a composite bit stream in digital multiplexer 112. The resulting digital bit stream proceeds sequentially through forward error encoder 114, symbol or bit interleaver 116, symbol or bit, phase, and/or amplitude modulator 118, narrow band IF amplifier 120, wideband multiplier or spreader 122, wide band IF amplifier 124, wide band mixer 126, and final power amplifier 128. Oscillators or equivalent synthesizers derive the bit or baud frequency 130, pseudo-random noise or "chip" frequency 132, and carrier frequency 134. The PRN generator 136 comprises deterministic logic generating a pseudo-random digital bit stream capable of being replicated at the remote receiver. The ring generator 138 on command generates code functionally equivalent to a "ring".

The transceiver receive function 108 demodulation operations mirror the corresponding transmit modulation functions in the transmitter section 106. The signal is received by the non-directional antenna 68 and conducted to the circulator 104. An amplifier 142 amplifies the received signal for mixing to an IF at mixer 144. The IF signal is amplified 146 and multiplied or despread 148 and then IF amplified 150 again. The IF signal then is conducted to a bit or symbol detector 152 which decides the polarity or value of each channel bit or symbol, a bit or symbol de-interleaver 154 and then to a forward error decoder 156. The composite bit stream from the FEC decoder 156 is then split into its several voice, data, and command components in the de-multiplexer 158. Finally a voice decoder 160 performs digital-to-analog converting and results in a voice signal for communication to the user by a speaker or other means. Local oscillator 162 provides the first mixer 144 LO and the bit or symbol detector 152 timing. A PRN oscillator 164 and PRN generator 166 provide the deterministic logic of the spread signal for despreading purposes. The baud or bit clock oscillator 168 drives the bit in the bit detector 152, forward error decoder 156 and the voice decoder 160.

The bit or symbol interleaver 116 and de-interleaver 154 provide a type of coded time diversity reception which provides an effective power gain against multipath fading to be expected for mobile users. Its function is to spread or diffuse the effect of short bursts of channel bit or symbol errors so that they can more readily be corrected by the error correction code.

As an alternative mode of operation, provision is made for direct data or facsimile or other digital data input 170 to the transmitter chain and output 172 from the receiver chain.

A command decoder 174 and command logic element 176 are coupled to the forward error decoder 156 for receiving commands or information. By means of special coding techniques known to those skilled in the art, the non-voice signal output at the forward error decoder 156 may be ignored by the voice decoder 160 but used by the command decoder 174. An example of the special coding techniques are illustrated in FIG. 7 by the MUX 112 and DEMUX 158.

As shown, acquisition, control and tracking circuitry 178 are provided in the receiver section 108 for the three receive-side functional oscillators 162, 164, 168 to acquire and track the phase of their counterpart oscillators in the received signal. Means for so doing are well known to those skilled in the art.

Referring again to FIG. 7, an arrangement is provided for generating call requests and detecting ring signals. The ring generator 138 generates a ring signal based on the user's code for calling out with the user unit 22. For receiving a call, the ring signal is detected in a fixed matched filter 198 matched to a short pulse sequence which carries the user's unique code. By this means each user can be selectively called. As an option, the ring detect and call request signals may be utilized in poll/response mode to provide tracking information on each active or standby mode user. Course tracking information, adequate for management of the call routing functions is provided by comparison of signal quality as received at various modes.

For precision location of the user, the user response signal time is accurately locked to the time of receipt of the polling or timing signal, to a fraction of a PRN chip width. The distance between an individual node and a user may then be determined by providing a timing signal to the selected user unit from at least one node, providing a timing response signal from the selected user unit in response to each timing signal, receiving the timing response signal by at least one node, and measuring the response time of the user unit to the timing signal. The position of the user unit can then be determined based on the round trip time of transmission of the timing signal and receipt of the timing response signal from a plurality of nodes. Measurement of the round trip poll/response time from two or more nodes or time differences of arrival at several nodes provides the basic measurement that enables solution and provision of precise user position. Further, ground and satellite transmitters and receivers may duplicate the functions summarized above.

In another aspect of the invention, given a priori information, for example, as to the route plan of a vehicle, a single round trip poll/response time measurement from a single node can yield valuable user position information. The position means may store a priori information about the selected user unit and may determine the position of the selected user unit by providing a timing signal to the user unit from a node, measuring the response time of the user unit to the timing signal at the node, and determining the position of the user unit based on such measurement and on the a priori information. An example of a priori information includes the sought-to-be travelled route of a user. By knowing the route of a selected user and the distance from a node, determined by application of the present invention, the central controller can determine the position of a selected user.

Ideally suited for position determination is the use of code division multiple access (CDMA) technology which provides an important spectral utilization efficiency gain and higher spatial frequency reuse factor made possible by the use of smaller satellite antenna beams. In regard to power efficiency, which is a major factor for the satellite-mobile links, the satellite transmitter source power per user is minimized by the use of forward-error-correcting coding, which in turn is enabled by the above use of spread spectrum code division multiple access (SS/CDMA) technology and by the use of relatively high antenna gain on the satellite. CDMA and forward-error-correction coding are known to those skilled in the art and no further details are given here.

In addition, the Code Division Multiplex system has the following important advantages in the present system. Blank time when some of the channels are not in use reduces the average interference background. In other words, the system overloads and underloads gracefully. The system inherently provides flexibility of baseband rates; as opposed to FDM systems, signals having different baseband rates can be multiplexed together on an ad-hoc basis without complex preplanned and restrictive sub-band allocation plans. Not all users need the same baseband rate. Satellite antenna sidelobe control problems are significantly reduced. Numerical studies of out-of-cell interference factors show that secondary lobe responses may effectively be ignored. Co-code reassignment (that is reuse of the same spreading code) is feasible with just one beam separation. However, because there are effectively (i.e., including phasing as a means of providing independent codes) an unlimited number of channel codes, the requirements on space division are eased; there is no need to reuse the same channel access, i.e., spreading code.

Accurate position determination can be obtained through two-dimensional multi-lateration. Each CDMA mobile user unit's transmitted spreading code is synchronized to the epoch of reception of the pilot signal from its current control site, whether ground or satellite node. The normal mode of operation will be two-dimensional, i.e., based upon two receptions, at ground or satellite nodes of the user response code. In conjunction with a priori information inherent in a topographic database, e.g., altitude of the surface of the earth, position accuracy to within a fraction of a kilometer can be provided.

In a CDMA system, means for determining the position of a mobile user relative to a multiplicity of known system nodes, either fixed on the ground or at known positions in space, is largely incidental to the function of transmitting and/or receiving the CDMA signal at multiple sites. The receiving function requires synchronization of the epoch of a local spread code generator to that of the received spread code, so that having achieved code synchronization, one inherently has a measure of the delay time and hence the range of the signal. Various references describe how this information can be used in several different geometrical configurations to provide the delay measurements necessary to provide hyperbolic, elliptical, spherical or hybrid multi-lateration position determination. By any of these means the mobile position can either be determined by the network controller or by the mobile user and relayed to the network controller.

By virtue of the above discussed design factors the system in accordance with the invention provides a flexible capability of providing the following services: high quality, high rate voice and data service; facsimile (the standard group 3 as well as the high speed group 4); two way messaging, i.e., data interchange between mobile terminals at variable rates; paging rural residential telephone; private wireless exchange; in conjunction with automatic position determination and reporting to within several hundred feet.

It is anticipated that the satellite will utilize geostationary orbits but is not restricted to such. The invention permits operating in other orbits as well. The system network control center 12 is designed to normally make the choice of which satellite or ground node a user will communicate with. In another embodiment, as an option, the user can request his choice between satellite link or direct ground-based link depending on which provides clearer communications at the time or request his choice based on other communication requirements.

While a satellite node has been described above, it is not intended that this be the only means of providing above-ground service. In the case where a satellite has failed or is unable to provide the desired level of service for other reasons, for example, the satellite has been jammed by a hostile entity, an aircraft or other super-surface vehicle may be commissioned to provide the satellite functions described above. The "surface" nodes described above may be located on the ground or in water bodies on the surface of the earth. Additionally, while users have been shown and described as being located in automobiles, other users may exist. For example, a satellite may be a user of the system for communicating signals, just as a ship at sea may or a user on foot.

While several particular forms of the invention have been illustrated and described, it will be apparent that various modifications can be made without departing from the spirit and scope of the invention. Accordingly, it is not intended that the invention be limited, except by the appended claims.

What is claimed is:

1. A cellular communications system comprising:
   at least one node positioned so to establish a set of cells, each node including means for transmitting and receiving different predetermined sets of code division multiple access coded, digitally modulated spread spectrum waveforms;
   a plurality of user units within the cells, each user unit including means for communicating with at least one of said nodes and being operatively responsive to a predetermined one of the sets of code division multiple access coded waveforms to thereby establish selective communication with at least one of said nodes; and
   position determination means for determining the position of a selected user unit by providing a timing signal carried by one of the sets of code division multiple access coded waveforms to the user unit from one or more nodes, providing a timing response signal carried by one of the sets of code division multiple access coded waveforms from the selected user unit in response to each timing signal, receiving the timing response signal by at least one node, measuring the response time of the user unit to each timing signal, and determining the position of the user unit based on such measurements.

2. In the operation of a cellular communications system having a plurality of user units and at least one cellular node so as to establish at least one cell, each node and user unit including means for transmitting and receiving different predetermined sets of code division multiple access coded digitally modulated spread spectrum waveforms, the method for determining the position of a selected user unit comprising:

a) providing a timing signal carried by one of the sets of code division multiple access coded waveforms to the selected user unit from at least one node;

b) providing a timing response signal carried by one of the sets of code division multiple access coded waveforms from the selected user unit in response to the timing signal;

c) receiving the timing response signal by at least one node;

d) measuring the response time of the user unit to the timing signal based on receipt of the timing response signal; and e) determining the position of the user unit based on the round trip time of transmission of the timing signal and receipt of the timing response signal.

\* \* \* \* \*